United States Patent
Conte et al.

(10) Patent No.: US 12,026,652 B2
(45) Date of Patent: *Jul. 2, 2024

(54) GENERATION OF ENGAGEMENT AND SUPPORT RECOMMENDATIONS FOR CONTENT CREATORS

(71) Applicant: Patreon, Inc., San Francisco, CA (US)

(72) Inventors: Jack Conte, Cotati, CA (US); Scott Takahashi, Oakland, CA (US); Manuel Andere, Mountain View, CA (US); Carlos Cabrera, San Francisco, CA (US)

(73) Assignee: PATREON, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,317

(22) Filed: Jan. 10, 2023

(65) Prior Publication Data

US 2023/0162118 A1 May 25, 2023

Related U.S. Application Data

(63) Continuation of application No. 17/147,088, filed on Jan. 12, 2021, now Pat. No. 11,556,877, which is a
(Continued)

(51) Int. Cl.
*G06Q 10/0637* (2023.01)
*G06Q 10/0639* (2023.01)
*G06Q 30/0204* (2023.01)

(52) U.S. Cl.
CPC ... *G06Q 10/0637* (2013.01); *G06Q 10/06393* (2013.01); *G06Q 30/0204* (2013.01)

(58) Field of Classification Search
CPC ......... G06Q 10/0637; G06Q 10/06393; G06Q 30/0204
See application file for complete search history.

(56) References Cited

U.S. PATENT DOCUMENTS 7,921,028 B2 * 4/2011 Cole .................... G06Q 50/184
705/7.29
8,051,040 B2 11/2011 Johnson
(Continued)

FOREIGN PATENT DOCUMENTS

JP 2019191623 A 10/2019
WO 2009045899 A2 4/2009

OTHER PUBLICATIONS

Shariatmadari, Ali. "Data Dissemination using Information-Centric Networking." Order No. 10194046 University of Toronto (Canada), 2016. Ann Arbor (Year: 2016).*
(Continued)

*Primary Examiner* — Amber A Misiaszek
(74) *Attorney, Agent, or Firm* — Esplin & Associates, PC

(57) ABSTRACT

Systems and methods are provided for generating engagement recommendations suggesting ways that one or more creators of content may maximize subscribership and/or subscription-based revenue, as well as support recommendations suggesting ways that the one or more creators of content may realize successful support of their content creation. Engagement recommendations can involve suggestions regarding when and/or how to engage one or more subscribers that results in a positive impact to subscribership and/or subscription-based revenue. Support recommendations can involve suggestions regarding when and/or how to elicit support in line with preferred indicia of success set forth by the one or more creators.

20 Claims, 6 Drawing Sheets

Related U.S. Application Data continuation of application No. 16/827,245, filed on Mar. 23, 2020, now Pat. No. 10,936,986, which is a continuation of application No. 15/432,788, filed on Feb. 14, 2017, now Pat. No. 10,621,532.

(56) References Cited

U.S. PATENT DOCUMENTS

| | | | |
|---|---|---|---|
| 8,375,024 | B2 | 2/2013 | Goeldi |
| 8,850,490 | B1* | 9/2014 | Thomas ........... H04N 21/47211 725/50 |
| 9,035,163 | B1 | 5/2015 | Mohajer |
| 9,060,249 | B2 | 6/2015 | Meredith |
| 9,558,277 | B2 | 1/2017 | Pappas |
| 9,734,521 | B2 | 8/2017 | Curtis |
| 9,767,208 | B1 | 9/2017 | Chow |
| 9,870,581 | B1 | 1/2018 | Vormweg |
| 10,356,574 | B1 | 7/2019 | Wood |
| 10,394,408 | B1 | 8/2019 | Freund |
| 10,607,242 | B1 | 3/2020 | Wood |
| 10,621,532 | B1 | 4/2020 | Conte |
| 10,936,986 | B2 | 3/2021 | Conte |
| 10,937,042 | B2 | 3/2021 | Wood |
| 11,049,191 | B1 | 6/2021 | Wilczek |
| 11,238,542 | B1 | 2/2022 | Wixted |
| 11,270,330 | B1 | 3/2022 | Brini |
| 2002/0036654 | A1 | 3/2002 | Evans |
| 2002/0103698 | A1 | 8/2002 | Cantrell |
| 2007/0038516 | A1 | 2/2007 | Apple |
| 2007/0069013 | A1 | 3/2007 | Seifert |
| 2007/0164554 | A1 | 7/2007 | Krone |
| 2008/0120185 | A1 | 5/2008 | Evans |
| 2008/0183577 | A1 | 7/2008 | Evans |
| 2008/0215467 | A1* | 9/2008 | Huffman ................. G06Q 40/04 705/30 |
| 2008/0265020 | A1 | 10/2008 | Copeland |
| 2009/0069911 | A1 | 3/2009 | Stefik |
| 2009/0158318 | A1* | 6/2009 | Levy ................... G06Q 30/0236 386/249 |
| 2009/0234710 | A1 | 9/2009 | Belgaied Hassine |
| 2011/0258049 | A1 | 10/2011 | Ramer |
| 2011/0295722 | A1 | 12/2011 | Reisman |
| 2012/0054666 | A1 | 3/2012 | Baird-Smith |
| 2012/0179556 | A1 | 7/2012 | Ertas |
| 2012/0190386 | A1 | 7/2012 | Anderson |
| 2012/0272278 | A1 | 10/2012 | Bedi |
| 2012/0278725 | A1 | 11/2012 | Gordon |
| 2012/0311462 | A1 | 12/2012 | Devecka |
| 2013/0080328 | A1 | 3/2013 | Royyuru |
| 2013/0197979 | A1* | 8/2013 | Han ................... G06Q 30/0207 705/14.1 |
| 2013/0226691 | A1 | 8/2013 | Chatow |
| 2013/0275429 | A1 | 10/2013 | York |
| 2014/0025473 | A1 | 1/2014 | Cohen |
| 2014/0032326 | A1 | 1/2014 | Li |
| 2014/0067554 | A1 | 3/2014 | Heppding |
| 2014/0067702 | A1 | 3/2014 | Rathod |
| 2014/0122507 | A1 | 5/2014 | Zeng |
| 2014/0164049 | A1 | 6/2014 | Yakos |
| 2014/0164514 | A1 | 6/2014 | Eteminan |
| 2014/0214641 | A1 | 7/2014 | Acker, Jr. |
| 2014/0280121 | A1 | 9/2014 | Sharp |
| 2014/0324604 | A1 | 10/2014 | Munoz Torres |
| 2014/0366047 | A1 | 12/2014 | Thomas |
| 2015/0066189 | A1 | 3/2015 | Mulligan |
| 2015/0066675 | A1 | 3/2015 | Camelio |
| 2015/0161692 | A1 | 6/2015 | Tembo |
| 2015/0193889 | A1 | 7/2015 | Garg |
| 2015/0363899 | A1 | 12/2015 | Krause |
| 2016/0071058 | A1 | 3/2016 | Galuten |
| 2016/0080485 | A1 | 3/2016 | Hamedi |
| 2016/0124918 | A1 | 5/2016 | Ying |
| 2016/0189198 | A1 | 6/2016 | Mckenzie |
| 2016/0210650 | A1 | 7/2016 | Sewell |
| 2016/0232480 | A1 | 8/2016 | Erez |
| 2016/0239807 | A1 | 8/2016 | Creighton |
| 2016/0357376 | A1 | 12/2016 | Carrigan |
| 2017/0076348 | A1 | 3/2017 | Jennings |
| 2017/0083930 | A1 | 3/2017 | Nagaraj |
| 2017/0161794 | A1 | 6/2017 | Zhu |
| 2017/0337621 | A1 | 11/2017 | Peters |
| 2018/0040019 | A1 | 2/2018 | Gavlovski |
| 2018/0075147 | A1 | 3/2018 | Bagheri |
| 2018/0121973 | A1 | 5/2018 | Dimascio |
| 2018/0144052 | A1 | 5/2018 | Sayyadi-Harikandehei |
| 2018/0285933 | A1 | 10/2018 | Lee-Chan |
| 2018/0365709 | A1 | 12/2018 | Modani |
| 2019/0026280 | A1 | 1/2019 | Aviyam |
| 2019/0026782 | A1 | 1/2019 | Mcgrath |
| 2019/0164082 | A1 | 5/2019 | Wu |
| 2019/0290965 | A1 | 9/2019 | Oren |
| 2019/0361577 | A1 | 11/2019 | Burns |
| 2020/0007934 | A1 | 1/2020 | Ortiz |
| 2020/0020014 | A1 | 1/2020 | Jin |
| 2020/0089724 | A1 | 3/2020 | Zimovnov |
| 2020/0134696 | A1 | 4/2020 | Lardeux |
| 2020/0219025 | A1 | 7/2020 | Conte |
| 2020/0219114 | A1 | 7/2020 | Wood |
| 2020/0300538 | A1 | 9/2020 | Avakian |
| 2020/0311751 | A1 | 10/2020 | Shi |
| 2020/0320571 | A1 | 10/2020 | Singh |
| 2020/0351561 | A1 | 11/2020 | Spencer |
| 2021/0133651 | A1 | 5/2021 | Conte |
| 2021/0133775 | A1 | 5/2021 | Wood |
| 2021/0158317 | A1 | 5/2021 | Kurylko |
| 2021/0192460 | A1 | 6/2021 | Xu |
| 2022/0156781 | A1 | 5/2022 | Brini |
| 2022/0277356 | A1 | 9/2022 | Russo |
| 2022/0318704 | A1 | 10/2022 | Brini |
| 2022/0377399 | A1 | 11/2022 | Bonner |
| 2023/0153840 | A1 | 5/2023 | Wood |
| 2023/0206154 | A1 | 6/2023 | Brini |
| 2023/0245162 | A1 | 8/2023 | Thomas |
| 2023/0252097 | A1 | 8/2023 | Church |
| 2023/0325866 | A1 | 10/2023 | Harithas |

OTHER PUBLICATIONS

Content and conduit: Relative profitability in the new era of television Todreas, Timothy Michael. ProQuest Dissertations and Theses, ProQuest Dissertations Publishing. (1996) (Year: 1996) 431 pages.

F. Cappa, S. Franco, E. Ferrucci and R. Maiolini, "The Impact of Product and Reward Types in Reward-Based Crowdfunding," Mar. 11, 2021, in IEEE Transactions on Engineering Management, 12 pages, doi: 10.1109/TEM.2021.3058309 (Year: 2021).

Gerri Detweiler, Reward Crowdfunding, Mar. 20, 2020, Nav, 11 pages, https://www.nav.com/business-financing-options reward-crowdfunding/ (Year: 2020).

Harris, William. "26 Inexpensive Customer Delight Ideas Worth Trying to Fuel Business Growth" Sellbrite, Jun. 2016, https://ww.sellbrite.com/blog/customer-delight/(Year: 2016) 26 pages.

Hyken, Shep. "Seven Ways to Properly Give a Gift to Your Customers" Shep Hyken's Blog, Jun. 2016, https://hyken.com/internal-customers/seven-ways-properly-give-gift-customers/ (Year: 2016) 11 pages.

Investing in Games With Fig Game Shares, Feb. 28, 2019, fig.co, 12 pages, https://www.fig.co/invest#rewards-based-crowdfunding (Year: 2019).

J. Lahann, M. Scheid and P. Fettke, "Utilizing Machine Learning Techniques to Reveal VAT Compliance Violations in Accounting Data," 2019 IEEE 21st Conference on Business Informatics (CBI), 2019, pp. 1-10, doi: 10.1109/CBI.2019.00008.

L. Xuefeng and W. Zhao, "Using Crowdfunding in an Innovative Way: A Case Study from a Chinese Crowdfunding Platform," 2018 Portland International Conference on Management of Engineering and Technology (PICMET), 2018, pp. 1-9, doi: 10.23919/ PICMET. 2018.8481838. (Year: 2018).

Lopez et al., A Recommender System Based on a Machine Learning Algorithm for B2C Portals; Published in: 2009 IEEE/WIC/ACM

(56) References Cited

OTHER PUBLICATIONS

International Joint Conference on Web Intelligence and Intelligent Agent Technology Date of Conference: Sep. 15-18, 2009 (Year: 2009).

Massimiliano Barbi and Marco Bigelli, Crowdfunding practices in and outside the US, Jun. 2017, 47 pages, ResearchGate DOI: 10.1016/ j.ribaf.2017.05.013 (Year: 2017).

Mattison, David, "Reality Check for your Muses: Creativity and Business Innovation Resources", Searcher; Medford vol. 16, Iss. 10, (Nov./Dec. 2008): 16-21, 55-59. (Year: 2008).

Miller, Nicole. "Inside Buffer's Community Delight Headquarters: How and Why We Send Swag and What it all Costs" Buffer, Apr. 27, 2015, 23 pages, https://buffer.com/resources/community-delight/ (Year: 2015).

Ondrejka, Cory, "Escaping the gilded cage: User created content and building the metaverse", 49 N.Y.L. Sch. L. Rev. 31 (2004). (Year: 2004) (23 pages).

Shipwire. "Marketing inserts" Shipwire support, Feb. 27, 2015, https://www.shipwire.com/w/support/marketing-inserts/ (Year: 2015) 9 pages.

Vanderhoef, II, Robert John, et al., "An Industry of Indies: The New Cultural Economy of Digital Game Production", University of California, Santa Barbar, Sep. 2016, pp. 1-259. (Year: 2016).

Wilson et al., Real World Applications of Machine Learning Techniques over Large Mobile Subscriber Datasets, SE4ML: Software Engineering for Machine Learning , 9 pages, ARXIV ID: 1502.02215 Publication Date: Feb. 8, 2015 (Year: 2015).

Yarbro, Printify Vs. Printful: Pros and Cons, Dec. 9, 2019, nomadicwander, https://nomadicwander.com/2019/12/09. printify-vs-printful-pros-and-cons/ (Year:2019) 10 pages.

Iulia, "9 social media apps paying their content creators", May 16, 2021 (Year: 2021).

Perez, "Watchworthy's personalized TV recommendation app will help you find your next binge ", Mar. 24, 2020 (Year: 2020).

Author(s):Osuala Title: Impact of subscription based crowdfunding on creators online channels Journal: ERF [online]. Publication date: 2019.[retrieved on: Feb. 23, 2023 ]. Retrieved from the Internet: < URL: https://aisel.aisnet.org/cgi/viewcontent.cgi?article=1017& context=amcis2019> (Year: 2019).

Author(s) Rakesh Title: Personalized recommendations of twitter lists using content and network information Journal: AAAI [ online]. Publication date: 2014. [retrieved on: Sep. 29, 2023 ]. Retrieved from the Internet: < URL: https://ojs.aaai.org/index.php/ICWSM /article/view/14558> (Year: 2014).

Fischer, "Ad models break everyone's brains': How Patreon and Substack are trying to make the internet a better place with membership and subscriptions" (Aug. 11, 2019) (Year: 2019).

\* cited by examiner

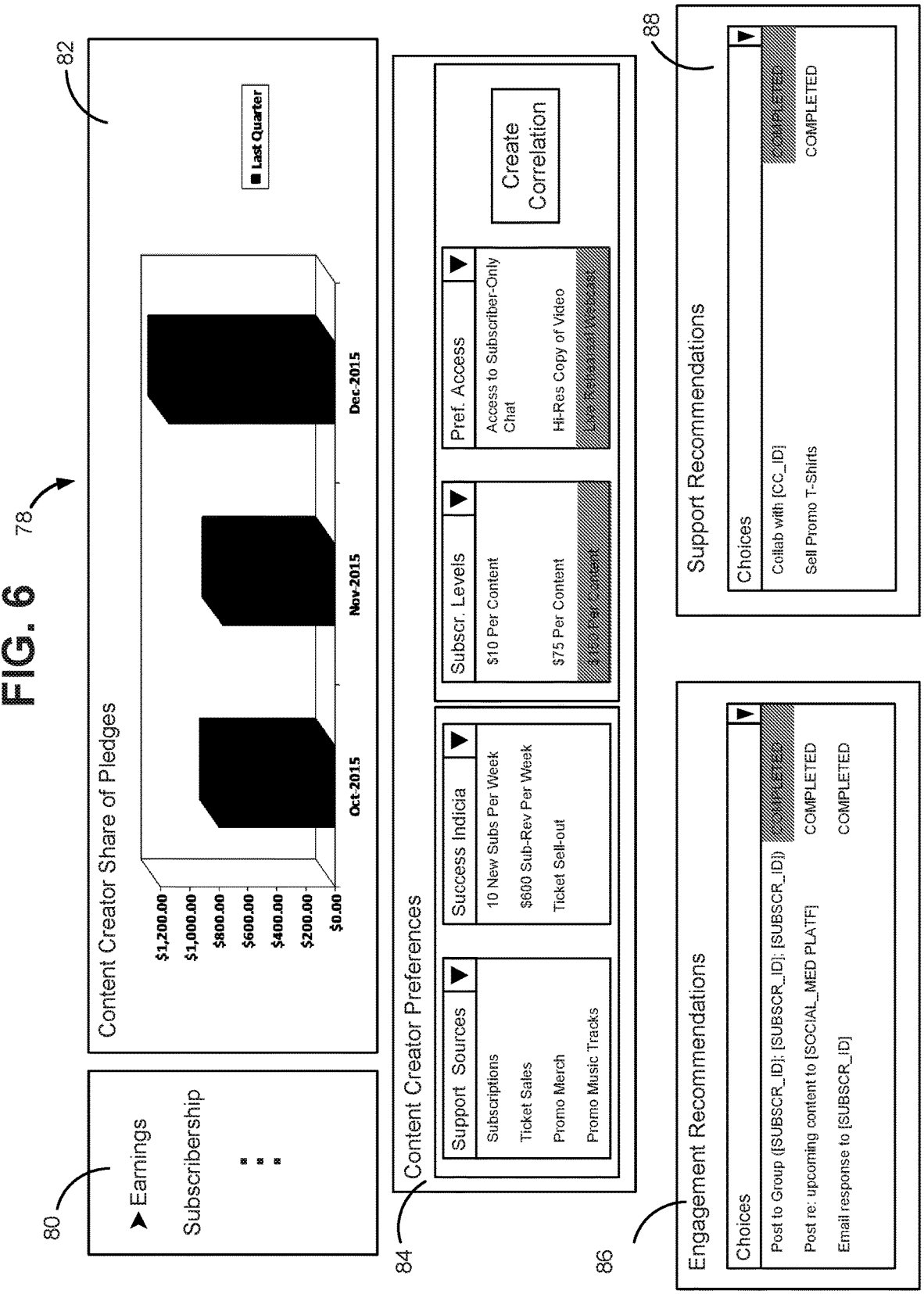

GENERATION OF ENGAGEMENT AND SUPPORT RECOMMENDATIONS FOR CONTENT CREATORS

FIELD

The disclosure relates to membership platforms, and in particular, to subscription-based funding. Engagement and/or support recommendations suggesting how and/or when to engage with consumers that subscribe to and/or indicate an interest in content creators, as well as supporting parties, may be provided to a content creator to allow the content creator to maximize subscribership and revenue generated through subscription-based funding.

BACKGROUND

Different platforms can be utilized by entities seeking contributions from the general public to obtain a needed service(s) and/or resource(s). Some of these platforms facilitate raising resources (i.e., funds) from the general public through monetary contributions or donations to support a project. Oftentimes, supporters of a project are given rewards or special perks, where the size and/or exclusivity of the rewards or special perks can depend on the amount contributed.

SUMMARY

The disclosure describes generating engagement recommendations suggesting ways that one or more creators of content may maximize subscribership and/or subscription-based revenue through enhancing interactions between the one or more content creators and their subscribers/potential subscribers. The disclosure describes generating support recommendations suggesting ways that one or more creators of content may realize successful support of their content creation, whether that support is realized through subscription-based revenue and/or through non-subscription-based support activities. Engagement recommendations can involve suggestions regarding when and/or how to engage one or more subscribers that results in a positive impact to subscribership and/or subscription-based revenue. Support recommendations can involve suggestions regarding when and/or how to elicit support in line with preferred indicia of success set forth by the one or more creators.

One aspect of the disclosure relates to a recommendation generation system configured to generate content creator engagement recommendations for a content creator that can enhance engagement of subscribership to content created by the content creator. The system may comprise one or more physical processors configured by machine-readable instructions to obtain campaign information associated with the content creator. The campaign information may include subscribership information and creation information. The subscribership information can characterize demographic information describing one or more subscribers of the content creator, subscriber-initiated interaction between at least one subscriber and the content creator, and/or subscription performance metrics. The creation information can characterize at least one of content created by the content creator, the content creator, and/or creator-initiated interaction between the at least one subscriber and the content creator. The system may comprise one or more physical processors configured by machine-readable instructions to analyze the campaign information to determine impact information indicative of future content creator-initiated interactions' impact on the subscribership. The system may comprise one or more physical processors configured by machine-readable instructions to generate the content creator engagement recommendations based on the campaign information and the impact information, the content creator engagement recommendations representing one or more of the future content creator-initiated interactions having a positive impact on the subscribership. The system may comprise one or more physical processors configured by machine-readable instructions to deliver one or more of the content creator engagement recommendations for presentation to the content creator.

Subscription performance metrics may characterize revenue-related performance of the subscribership. Subscription performance metrics may characterize one or more of a new subscription creation rate, a subscriber retention rate, and/or a subscriber churn rate.

The one or more physical processors configured to analyze the campaign information to determine impact information may be further configured by machine-readable instructions to determine an impact of instances of the subscriber-initiated and/or content creator-initiated interactions on the subscribership. The instances of the subscriber-initiated and/or content creator-initiated interactions may be historical instances. The historical instances may be representative of subscriber-initiated interactions between subscribers of a second content creator and the second content creator and/or content-initiated interactions between the second content creator and the subscribers of the second content creator.

The one or more physical processors configured to analyze the campaign information to determine impact information may be further configured by machine-readable instructions to determine one or more factors present in the instances of the subscriber-initiated and/or content creator-initiated interactions contributing to the determined impact. At least one of the one or more factors may comprise timing information. The content creator engagement recommendations may further comprise timing, based on the timing information, of the engagement in the one or more of the future content creator-initiated interactions.

The one or more physical processors configured to analyze the campaign information to determine impact information may be further configured by machine-readable instructions to identify one or more aspects of the instances of the subscriber-initiated and/or content creator-initiated interactions as one or more triggers for triggering engagement in the one or more of the future content creator-initiated interactions.

The one or more physical processors configured to analyze the campaign information to determine impact information may be further configured by machine-readable instructions to codify the impact, the one or more factors, and the one more triggers into one or more rules upon which the content creator engagement recommendations are based.

The content creator engagement recommendations may further comprise a recommendation to avoid one or more of the future content creator-initiated interactions having a negative impact on the subscribership.

One aspect of the disclosure relates to a recommendation generation system configured to generate support-maximizing recommendations for a content creator that can enhance the content creator's ability to create content via a subscription-based funding campaign. The system may comprise one or more physical processors configured by machine-readable instructions to obtain campaign information associated with the content creator. The campaign information may include subscribership information and creation information. The subscribership information may characterize demographic information describing one or more subscribers of the content creator, subscriber-initiated interaction between at least one subscriber and the content creator, and/or subscription performance metrics. The creation data may characterize at least one of content created by the content creator, the content creator, and/or creator-initiated interaction between the at least one subscriber and the content creator. The system may comprise one or more physical processors configured by machine-readable instructions to obtain content creator-specified information characterizing desired sources of support including subscribership-generated revenue supporting creation of the recurring content and/or one or more support activities supporting creation of the recurring content. The system may comprise one or more physical processors configured by machine-readable instructions to obtain content creator-specified indicia characterizing successful realization of support from the perspective of the content creator. The system may comprise one or more physical processors configured by machine-readable instructions to generate the support-maximizing recommendations based upon one or more correlations between the content creator-specified indicia and the campaign information. The system may comprise one or more physical processors configured by machine-readable instructions to deliver one or more of the support-maximizing recommendations for presentation to the content creator.

The one or more physical processors configured to generate the support-maximizing recommendations may be further configured by machine-readable instructions to generate webpage layout instructions for organizing webpage elements representing one or more aspects of the subscription-based funding campaign.

The one or more physical processors configured to generate the support-maximizing recommendations may be further configured by machine-readable instructions to transmit notifications suggesting that the content creator engage in one or more future creator-initiated interactions determined to result in the successful realization of support. The one or more physical processors may be configured by machine-readable instructions to transmit the notifications at times determined to be likely to result in the successful realization of support. The one or more support activities supporting creation of the recurring content support may comprise non-subscribership support activities.

The one or more physical processors configured to generate the support-maximizing recommendations may be further configured by machine-readable instructions to analyze campaign information associated with one or more other content creators related to the content creator by the same and/or similar creation information and/or subscribership information.

One aspect of the disclosure relates to a method of generating content creator engagement recommendations for a content creator that can enhance engagement of subscribership to content created by the content creator. The method may comprise obtaining campaign information associated with the content creator. The campaign information can include subscribership information and creation information. The subscribership information may characterize demographic information describing one or more subscribers of the content creator, subscriber-initiated interaction between at least one subscriber and the content creator, and/or subscription performance metrics. The creation information may characterize at least one of content created by the content creator, the content creator, and/or creator-initiated interaction between at least one subscriber and the content creator. The method may comprise analyzing the campaign information to determine impact information indicative of future content creator-initiated interactions' impact on the subscribership. The method may comprise generating the content creator engagement recommendations based on the campaign information and the impact information, wherein the content creator engagement recommendations represent one or more of the future content creator-initiated interactions having a positive impact on the subscribership. The method may comprise delivering one or more of the content creator engagement recommendations for presentation to the content creator.

The determining of impact information may further comprise determining an impact of instances of the subscriber-initiated and/or content creator-initiated interactions on the subscribership. The determining of impact information may further comprise determining one or more factors present in the instances of the subscriber-initiated and/or content creator-initiated interactions contributing to the determined impact. The determining of impact information may further comprise identifying one or more aspects of the instances of the subscriber-initiated and/or content creator-initiated interactions as one or more triggers for triggering engagement in the one or more of the future content creator-initiated interactions. The determining of impact information may further comprise codifying the impact, the one or more factors, and the one more triggers into one or more rules upon which the content creator engagement recommendations are based. At least one of the one or more factors may comprise timing information, and the content creator engagement recommendations may further comprise timing, based on the timing information, of the engagement in the one or more of the future content creator-initiated interactions.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 6 illustrates an example content creator user interface through which engagement recommendations may be presented and implemented.

DETAILED DESCRIPTION

Figure 1:
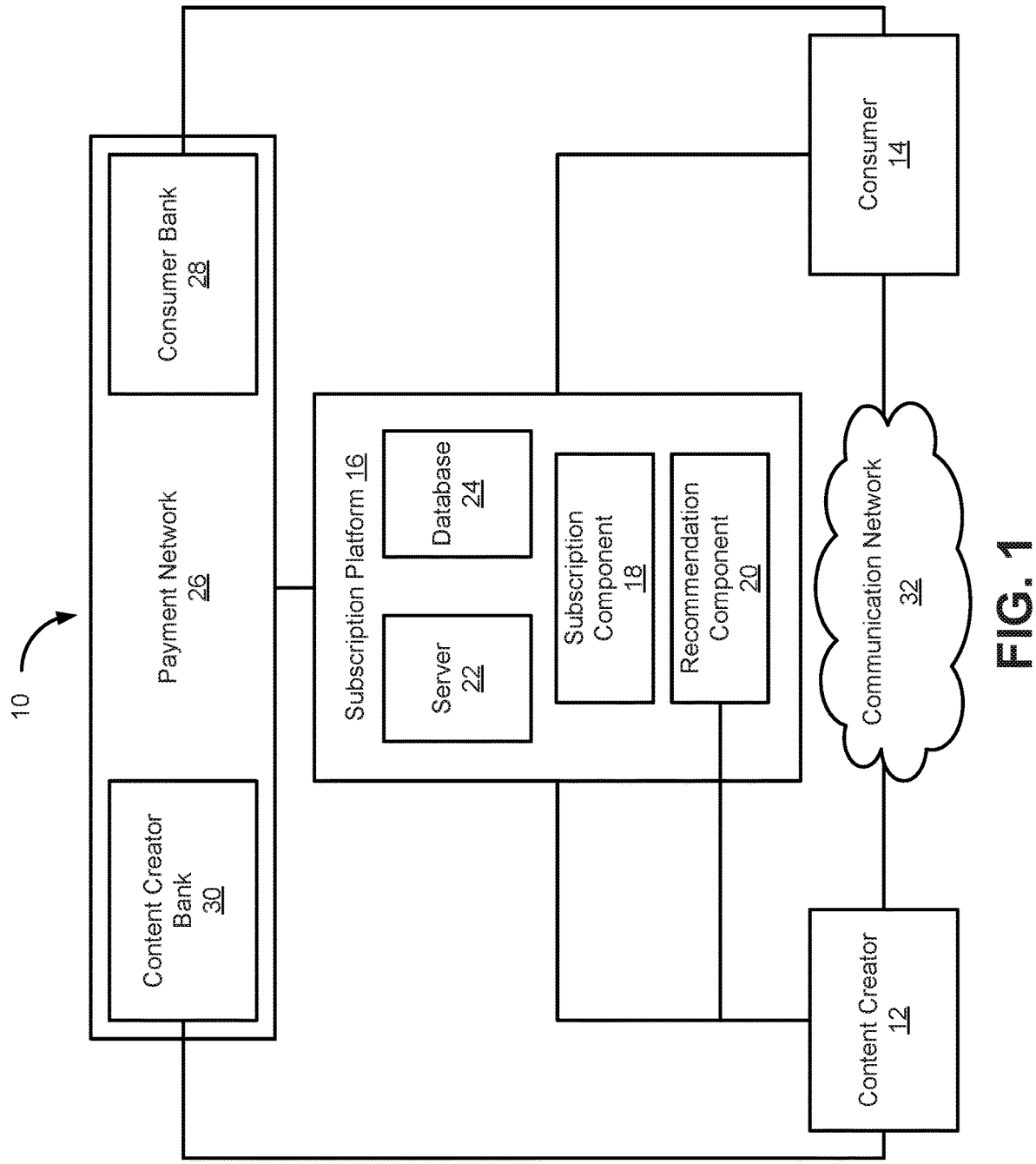
FIG. 1 illustrates an example membership system.

Some entities may seek to fund their business through subscriptions. Such entities may utilize online membership platforms to create a campaign that allows consumers to sign up for ongoing payments in exchange for rewards or other membership benefits.

Some entities seeking funding may be content creators, for example, artists, musicians, educators, etc. Content creators may create content, which can refer to any type of information, experience, or product provided to an audience or end-user, whether it be digital, analog, or virtual. For example, content may include but is not limited to video content, podcasts, photographic art, webcomics, do-it-yourself crafts, digital music, performance art, and other types of content. Content creators may utilize membership platforms that allow consumers to become subscribers of the content creator. As subscribers, consumers may contribute or donate money to a content creator on a recurring (e.g., weekly or monthly) basis or per piece of content created by the content creator. Content creators may interact with subscribers and/or prospective subscribers (e.g., consumers that show interest in the content created by content creators) in a variety of ways. It should be noted that although the disclosure may describe embodiments in the context of a subscriber-based membership platform such as a recurring content website, engagement recommendations can be provided to content creators irrespective of how content may be distributed and/or any particular membership platform utilized by the content creator.

In order to maximize revenue received from subscribers and/or increase subscribership, content creators can be provided with engagement recommendations. Engagement recommendations can refer to suggested interactions that can be undertaken by content creators in relation to subscribers and/or prospective subscribers, as well as when those suggested actions can be performed so that revenue and subscribership can be maximized. Such interactions may generate interest in the content created by the content creators, as well as maintain and/or increase subscribership and subscribership-generated revenue. Engagement recommendations can refer to suggestions regarding interactions that content creators may wish to avoid in order to avoid losing subscribers and/or at least maintain a current state of subscribership. Support recommendations can be provided to content creators and/or implemented on behalf of content creators to assist in maximizing non-subscription-based support for content creation.

Engagement recommendations can be generated based on one or more factors determined to have an impact on or result in some consequent regarding revenue and/or subscribership for one or more content creators. Once the impact of the factors is determined, those determinations may be codified into a system or model of behavior responsive to one or more triggers that can be applied to a content creator's current and/or preferred practices or habits regarding engagement (or lack thereof). These determinations may be used to guide the content creator's interactions with subscribers, the creation of content, revenue generation, etc. For example, if a subscriber's observed action(s) matches a trigger in the codified model, a corresponding response to the trigger can be identified and suggested to a content creator as an engagement recommendation.

Factors may include information characterizing subscribership including but not limited to: subscriber-specific information (e.g., subscriber demographic information and information reflecting one or more subscriber's engagement or interaction with the content creator); revenue-related subscription information (e.g., the amount of money received from subscribers); and/or performance-related subscription information (e.g., subscription creation, retention, and attrition/churn rates). Factors may include information characterizing creation including, but not limited to: information regarding the content creator (e.g., the type of content created by the content creator, the medium or venue through which content is created or provided, the type, timing, amount, and/or quality of the content creator's engagement with subscribers, etc.); and/or content creator-specified preferences regarding preferred revenue sources and/or revenue amounts and content creator-specified preferences regarding preferred correlations between subscription levels.

The factors may be factors that are currently relevant or that have been recently determined. The factors may be historical factors that have been monitored over some previous period of time. The factors may reflect characteristics of a content creator and his/her subscribers, other content creators to whom his/her subscribers also subscribe, as well as content creators that create the same or similar content and/or have subscription-based membership campaigns on a common or separate platform.

FIG. 1 illustrates an example subscriber-based membership system 10. A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation information, content information, information specifying desired and/or initial subscription levels, and/or preferred revenue source information which will be discussed in greater detail below. The page created by content creator 12 may be built using such information to make potential consumers aware of how content creator 12 may wish to be supported/receive support for his/her content creation in addition to subscribership revenue.

Consumer 14 may set up a subscriber account with subscription platform 16. In setting up the subscriber account, consumer 14 may input demographic information relevant to consumer 14, e.g., age, income, job, etc. Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and transfer the pledged amount from consumer bank 28 to content creator bank 30. Alternatively (or in addition to per content pledge donations), consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of, e.g., special perks or rewards. Content creator 12 can specify tiers of preferential access based upon the amount of money consumer 14 pledges to donate and/or depending on whether the pledged donation is a recurring donation or a per content donation. The amounts and/or types of pledged donations that can be made by consumer 14 to back content creator 12 can be referred to as subscription levels.

For example, in return for a monthly, recurring ten dollar donation, content creator 12 may provide a high-resolution digital image of the artwork created during that month to consumer 14. In exchange for a weekly, recurring ten dollar donation, content creator 12 may provide a high-resolution digital image of the artwork created during that month as well as a time-lapse video of content creator 12 creating the artwork. In exchange for a five dollar per content donation, content creator 12 may provide a low-resolution digital image of the artwork. For a one hundred dollar per content donation, content creator 12 may engage in a live webchat with consumer 14. Various types of preferential access can be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., WiFi), a mobile communication network, a satellite network, the Internet, fiber optic, coaxial cable, infrared, radio frequency (RF) or any other suitable network. The preferential access may be provided to consumer 14 from content creator 12 via subscriber platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access, as well as his/her preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in any type of suitable database configuration, such as a relational database, a structured query language (SQL) database, a distributed database, an object database, etc. Suitable configurations and database storage types will be apparent to persons having skill in the relevant art.

Content creator 12 may add subscribership information, update and/or delete existing subscribership information, add creation information, as well as update and/or delete creation information. Such changes can be input via subscription component 18 and reflected in its local memory and/or database 24. It should be understood that content creator 12 and/or consumer 14 may be an individual or some entity representative of an individual or group of individuals.

Apart from providing preferential access to consumer 14, content creator may engage with consumer 14 by interacting in a variety of ways. For example, content creator 12 may communicate with consumer 14 over email, one or more social media platforms, a messaging platform or other appropriate communication mechanism or method. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's webpage may be provided on the webpage allowing content creator 12 to share content creation progress updates with consumer 14. For example, content creator 12 may respond to a communication from consumer 14 posted on a comment section provided on content creator 12's webpage in a private message or as part of the comment thread. It should be noted that content creator 12 may engage a single consumer, e.g., consumer 14, one-on-one and/or may engage a group of consumers. For example, content creator 12 may post a "public" comment on his/her webpage that can be seen by any consumer that is a subscriber to content creator 12 and/or any consumer that may be a potential subscriber. It should be noted that a content creator's subscribers can be collectively referred to as the content creator's community.

Figure 2:
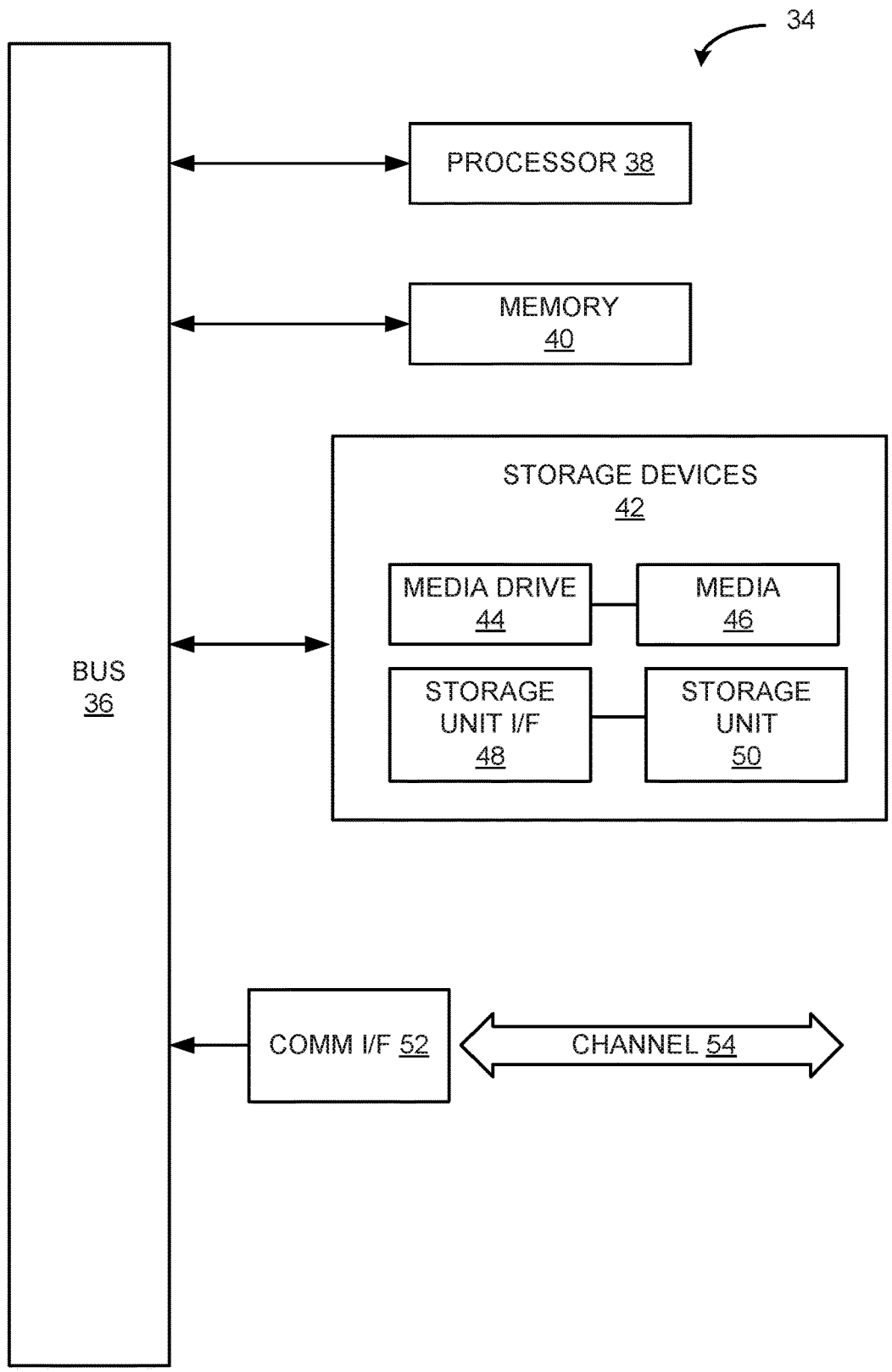
FIG. 2 is an example computing component that may be used to implement various features described in the disclosure.

FIG. 2 illustrates an example computing component that may be used to implement various features of the system and methods disclosed herein, for example, subscription platform 16, server 22, subscription component 18, payment network 26, recommendation component 20, and/or one or more elements comprising these components.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this disclosure, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components are implemented in whole or in part using software, in one embodiment, these software elements can be implemented to operate with a computing or processing component capable of carrying out the functionality described with respect thereto. One such example computing component is shown in FIG. 2. Various embodiments may be described in terms of this example computing component 34. After reading this disclosure, it will become apparent to a person skilled in the relevant art how to implement the application using other computing components or architectures.

Computing component 34 may represent, for example, computing or processing capabilities found within a desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 34 might also represent computing capabilities embedded within or otherwise available to a given device. For example, a computing component might be found in other electronic devices such as, for example, portable computing devices, and other electronic devices that might include some form of processing capability.

Computing component 34 might include, for example, one or more processors, controllers, control components, or other processing devices, such as a processor 38. Processor 38 might be implemented using a general-purpose or special-purpose processing engine such as, for example, a microprocessor, controller, or other control logic. In the illustrated example, processor 38 is connected to a bus 36, although any communication medium can be used to facilitate interaction with other components of computing component 34 or to communicate externally.

Computing component 34 might include one or more memory components, simply referred to herein as memory 40. For example, preferably random access memory (RAM) or other dynamic memory, might be used for storing information and instructions to be executed by processor 38. Memory 40 might be used for storing temporary variables or other intermediate information during execution of instructions, such as machine-readable instructions, to be executed by processor 38. Computing component 32 might include a read only memory ("ROM") or other static storage device coupled to bus 36 for storing static information and instructions for processor 38.

The computing component 34 might include one or more various forms of information storage mechanisms 42, which might include, for example, a media drive 44. The media drive 44 might include a drive or other mechanism to support fixed or removable storage media 46. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 46 might include, for example, a hard disk, an integrated circuit assembly, magnetic tape, cartridge, optical disk, a CD or DVD, or other fixed or removable medium that is read by, written to or accessed by media drive 44. As these examples illustrate, the storage media 46 can include a computer usable storage medium having stored therein computer software or data.

Computing component 34 might include other similar instrumentalities for allowing computer programs or other instructions or data to be loaded into computing component 34. Such instrumentalities might include, for example, a fixed or removable storage unit 50 and an interface 48. Examples of such storage units 50 and interfaces 48 can include a program cartridge and cartridge interface, a removable memory (for example, a flash memory or other removable memory component) and memory slot, a PCMCIA slot and card, and other fixed or removable storage units 50 and interfaces 48 that allow software and data to be transferred from the storage unit 50 to computing component 34.

Computing component 34 might include a communications interface 52. Communications interface 52 might be used to allow software and data to be transferred between computing component 34 and external devices. Examples of communications interface 52 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 52 might typically be carried on signals, which can be electronic, electromagnetic (which includes optical) or other signals capable of being exchanged by a given communications interface 52. These signals might be provided to communications interface 52 via a channel 54. This channel 54 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 40, storage unit 50, media 46, and channel 54. These and other various forms of computer program media or computer usable media may be involved in carrying one or more sequences of one or more instructions to a processing device for execution. Such instructions embodied on the medium, are generally referred to as "machine-readable code," "computer program code" or a "computer program product" (which may be grouped in the form of computer programs or other groupings). When executed, such instructions might enable the computing component 34 to perform features or functions of the disclosure as discussed herein.

Figure 3:
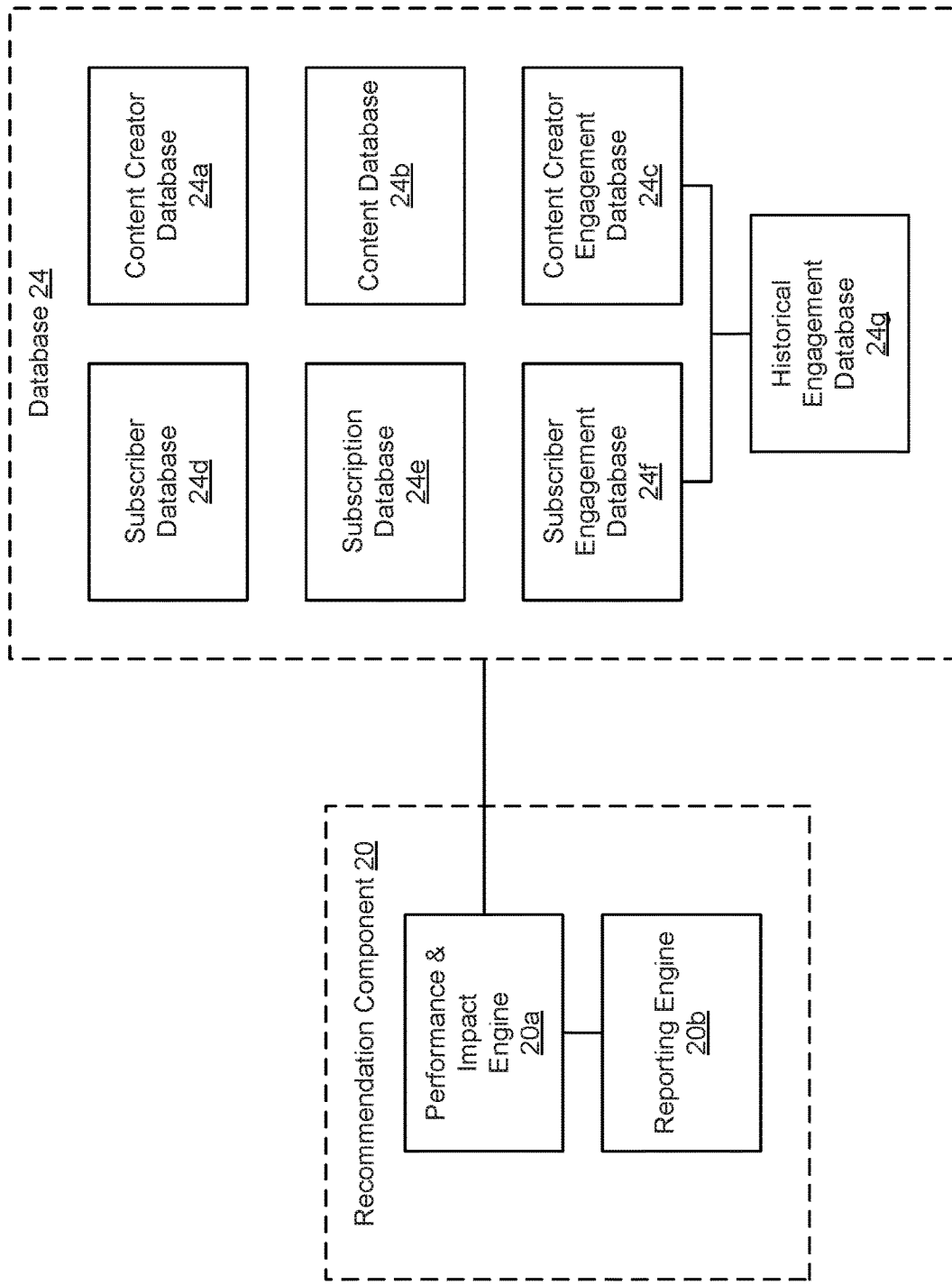
FIG. 3 illustrates an example engagement recommendation system.

FIG. 3 illustrates elements that may make up recommendation component 20 and database 24. As indicated previously, subscription component 18 may transmit information input by content creator 12 and/or consumer 14 regarding creation and/or subscribership information to database 24. Subscription platform 16, via server 22, for example, may monitor and obtain creation and/or subscribership information for storage in database 24. For example, subscription platform 16 may monitor and store additional subscriber demographic information as well as performance-related subscribership information, e.g., engagement activity between content creator 12 and his/her subscribers, one of whom may be consumer 14. For example, subscription platform 16 may monitor the amount of money being generated and/or lost through the subscribers, as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, subscribership relevant to content creator 12, as well as recent and/or historical engagement information can be stored. It should be noted that the elements and/or functionality of database 24 may be implemented in local memory resident in subscription component 18 or shared between database 24 and the local memory of subscription component 18 rather than solely in database 24.

Content creator information characterizing content creator 12 can be information reflecting the type of creator content creator 12 designates him/herself to be and/or any preferences regarding subscription offerings by content creator 12. For example, content creator type information can reflect that content creator 12 may be a paint artist, a digital artist, a sculptor, a video game developer, a writer, a performance artist, etc. Content creator preference information can reflect subscription levels content creator 12 wishes to offer to subscribers. Content creator preference information can reflect, e.g., a desired minimum revenue, preferred sources of revenue, subscription level proportions, etc. For example, content creator preference information may include information indicating content creator 12's desire for more subscribers pledging some amount of money or less subscribers pledging a greater amount of money. For example, content creator preference information may include information specifying that content creator 12 wishes to supplement his/her subscription-generated revenue with revenue generated from the sale of promotional merchandise. Such information may be stored in a content creator database 24*a*.

Content information characterizing the content that content creator 12 creates can refer to one or more of the type of content created, the medium in which the content is created and/or presented, the amount of content created, and/or the frequency at which the content is created. For example, type of content information and/or content medium information may indicate that content creator 12 creates paintings on canvas, develops video games for a mobile platform, performs in online musical performances, etc. For example, content amount information can reflect that content creator 12 created a series of artwork comprising four paintings. For example, content frequency information can indicate that content creator 12 developed three video games over the course of six months. Such information may be stored in content database 24*b*.

Content creator engagement information characterizing the interactions initiated by content creator 12 with subscribers/potential subscribers can refer to the type of interactions and/or the medium (e.g., social media platform) over which interactions took place, and/or the amount and/or frequency of interactions initiated by content creator 12. Content creator engagement information characterizing the interactions initiated by content creator 12 with subscribers/potential subscribers can refer to the timing of the interactions (e.g., whether the interaction was in response to a subscriber-initiated interaction and how quickly content creator responded to the subscriber initiated the interaction). Such information may be stored in content creator engagement database 24*c*.

As previously discussed, consumer 14 may subscribe to content creator 12 by registering with subscription platform 16. During registration, consumer 14 may input certain subscriber demographic information indicative of economic and/or social characteristics of consumer 14. Subscriber demographic information may reflect the yearly income of consumer 14, a geographic area in which consumer 14 resides, the age of consumer 14, interests of consumer 14, etc. Subscriber information can include data regarding the amount of money consumer 14 is currently pledged to donate to one or more content creators. Over time, as monitored and collected by subscription platform 16, subscriber information can include information regarding the amount of money consumer 14 has previously donated to one or more content creators, including content creator 12. Subscriber information, as monitored and obtained by subscription platform 16 may include an Internet Protocol (IP) address indicative of a current location of consumer 14 and/or an IP address indicating a payment source. Such information may be stored in subscriber database 24*d*.

Performance-related subscription information can refer to data characterizing revenue and/or subscriber retention and creation. For example, such information may reflect how many pledges and/or how much actual revenue content creator 12's subscriptions have generated over some period of time, e.g., when content creator 12 began his/her campaign, monthly or yearly revenue, etc. For example, such information may reflect pledged donations that fail, i.e., payment is not ultimately collected by a subscriber. For example, such information may reflect the rate at which consumers become actual subscribers (e.g., consumers that indicate interest in content creator 12 by "liking" content creator 12's webpage, and subsequently pledge a recurring donation), the rate at which subscribers unsubscribe (also referred to as attrition or churn rate), etc. Such information may be stored in subscription database 24*e*.

Subscriber engagement information characterizing the interactions initiated by a subscriber with content creator 12 can refer to the type of interactions and/or the medium (e.g., social media platform) over which interactions took place, the amount and/or frequency of interactions initiated by the subscriber, and/or specific dates/times of the subscriber initiated the interaction. Such information may be stored in subscriber engagement database 24*f*.

Periodically (e.g., every week or month) or aperiodically (e.g., upon instruction by an administrator of subscription platform 16), subscriber engagement information from subscriber engagement database 24*f* and content creator engagement information from content creator engagement database 24*c* can be transferred to historical engagement database 24*g*.

It should be noted that not all the information described above is necessarily required, and that information reflecting additional aspects of, e.g., the content, content creator, content creator preferences, and/or subscribership is contemplated by the disclosure. For example, content creator 12 need not initially specify his/her content creator preferences. For example, only some of the aforementioned types of demographic information may be collectable from subscribers. For example, subscriber data may include data reflecting other content creators to which a subscriber pledges donations.

FIG. 3 illustrates that recommendation component 20 may comprise a performance and impact engine 20*a* for obtaining performance statistics and generating engagement recommendations. Recommendation component 20 may comprise a reporting engine 20*b* for reporting or otherwise forwarding the recommendations and performance information to one or more content creators and/or subscription platform 16.

Performance and impact engine 20a may collect revenue and/or subscribership performance statistics from subscriber database 24d and/or subscription database 24e. For example, performance and impact engine 20a may obtain revenue-related subscription information (e.g., the amount of money pledged by and/or received from content creator 12's community of subscribers). For example, performance and impact engine 20a may obtain performance-related subscription information (e.g., subscription creation, retention, and attrition/churn rates regarding content creator 12's community of subscribers.

Performance and impact engine 20a may be configured to determine the impact of content creator and subscriber engagement scenarios on revenue and/or subscribership by analyzing historical engagement information. Upon determining the impact, or as part of the determination, performance and impact engine 20a may determine one or more factors that contributed to the resulting impact. Performance and impact engine 20a may codify the determined impact, relevant factors, and one or more aspects of an engagement that may be characterized as triggers into a system of rules or behavior model. Performance and impact engine 20a may apply the rules or model to the current status of a content creator's subscribership and/or interactions, and generate engagement suggestions for the content creator.

To determine impact, performance and impact engine 20a may analyze subscriber and content creator engagement information stored in historical engagement database 24g to determine the results of various content creator and subscriber interactions. For example, the engagement information may reflect that when content creator 12 has responded to a post made by consumer 14 on content creator 12's webpage within 1 hour, consumer 14 is likely to follow through with his/her pledged donation (rather than letting the pledge fail).

To determine relevant factors, performance and impact engine 20a may look at related interactions and/or engagements with the same or similar circumstances to identify factors that are likely to contribute to the resulting impact. For example, performance and impact engine 20a may obtain historical engagement information involving any subscriber-initiated contact with content creator 12, such as subscriber-initiated email communications, subscriber-initiated messages, etc. Performance and impact engine 20a may determine that regardless of the communication method, the speed with which content creator 12 replies to a subscriber is of the most import, resulting in a determination that time is a relevant factor rather than communication method.

In the above example, performance and impact engine 20a can identify subscriber-initiated communications to content creator 12 as being a trigger.

Given the above determinations, performance and impact engine 20a may create a rule that when a current subscriber initiates some communication with a content creator, content creator should respond within one hour. If, when monitoring subscriber engagements through, e.g., subscriber engagement information stored in database 24f, performance and impact engine 20a may instruct subscription platform 16 to notify or send a reminder to content creator 12 that he/she should respond to a communication from, e.g., consumer 14, within the hour.

For example, performance and impact engine 20a may analyze engagement information reflecting that when a group of content creator 12's subscribers are subscribing at a particular subscription level, a group post to all the subscribers at that particular subscription level oftentimes results in each of the subscribers, e.g., cycling up to a higher subscription level. In analyzing this engagement information, performance and impact engine 20a may determine that the relevant factors include the method and type of communication, i.e., a group post on a social media platform to which each of the subscribers belong. The performance and impact engine 20a may determine that another relevant factor is the actual subscription level, i.e., each of the subscribers being at the twenty dollar per month subscription level. Performance and impact engine 20a may determine the relevant trigger to be the existence of multiple subscribers subscribing at the twenty dollar per month subscription level. Performance and impact engine 20a may codify the above determinations into a rule specifying that when two or more subscribers are at the twenty dollar per month subscription level, content creator 12 should engage this particular group of subscribers with a group post on a social media platform common to the two or more subscribers. In the event that performance and impact engine 20a determines that such a scenario currently exists for content creator 12, content creator 12 may be notified of the situation and presented with an engagement recommendation suggesting taking the above-noted action.

As alluded to above, engagement recommendations generated by performance and impact engine 20a need not be limited to suggested interactions, but may include suggestions to avoid certain interactions. For example, performance and impact engine 20a may determine, by analyzing historical engagement information, that there is a negative impact on subscribership when content creators bombard prospective subscribers with too many communications, resulting in a failure to convert those prospective subscribers into actual subscribers. Performance and impact engine 20a may determine that the relevant factors include status of the consumer, i.e., a prospective subscriber that has "liked," "followed"" or "shared" content generated by content creator 12 but has not yet subscribed to content creator 12. Performance and impact engine 20a may determine that the relevant factors include the number of communications made to prospective subscribers, i.e., one private message per day. Performance and impact engine 20a may determine that the trigger is content creator 12's transmission of an email. Performance and impact engine 20a may create a rule specifying that content creator 12 should send, at most, one private message every other day to a prospective subscriber. If performance and impact engine 20a determines that content creator 12 has sent one private message to a prospective subscriber, a notification may be sent to content creator 12 reminding them to wait 48 hours before sending another private message to that prospective subscriber.

It should be noted that performance and impact engine 20a may obtain and analyze historical engagement information associated with a particular content creator, e.g., content creator 12. Performance and impact engine 20a may obtain and analyze historical engagement information associated with other content creators, e.g., those content creators having one or more subscribers that also subscribe to content creator 12, and/or content creators that create the same or a similar type of content as that created by content creator 12. Performance and impact engine 20a may obtain and analyze historical engagement information on a platform-wide basis, i.e., all historical engagement information stored regarding subscription platform 16.

It should be noted that performance and impact engine 20a may assign different weight values to factors, triggers, and/or determined impacts associated with engagement information arising from a particular content creator versus that arising from other content creators related by virtue of creating similar content versus that arising from platform-wide engagement information. Performance and impact engine 20a may assign different weight values to particular aspects of an impact determination. For example, performance and impact engine 20a may weight triggers involving the same impact factors more than triggers involving merely similar impact factors. Performance and impact engine 20a may train the aforementioned behavior model by refining one or more aspects of impact determination, impact factor determination, and trigger determination over time through the analysis of an increasing pool of engagement information. For example, the existence of anomalous scenarios or resulting impacts may be filtered out over time.

Making determinations and/or performing analyses as disclosed herein may involve applying one or more analytical methods including, but not limited to: correlation analysis; regression analysis; clustering; decision tree analysis; and Chi-squared Automatic Interaction Detection (CHAID), a specific type of decision tree analysis; or a combination of one or more such methods.

Performance and impact engine 20a may tier engagement recommendations according to the aggressiveness of suggested engagements. For example, performance and impact engine 20a may categorize engagement recommendations in terms of, e.g., aggressive subscription maximization, maintenance of subscribership, and/or basic "must-do's" simply not to lose existing subscribers. Based on content creator-specified preferences regarding subscribership and/or revenue-generation, e.g., subscription-level proportions, a preference for subscribership maximization rather than subscribership-generated revenue maximization, etc. Performance engine 20a may take such content creator-specified preferences into account, e.g., as another factor, when generating engagement recommendations.

Performance and impact engine 20a may generate engagement recommendations without necessarily analyzing historical engagement information. For example, performance and impact engine 20a may rely on statistical information alone, perform testing, e.g., A/B testing, and/or apply known or independently developed behavior models in generating engagement suggestions for one or more content creators. For example, without analyzing historical engagement information, performance and impact engine 20a may generate an engagement recommendation suggesting that high value subscribers (e.g., subscribers that pledge donations over some threshold amount) should be engaged by content creators more quickly than lower-value subscribers. For example, performance and impact engine 20a may generate an engagement recommendation suggesting that content creators engage subscribers via the most popular social media platforms when content creators wish to notify subscribers of upcoming content being created by those content creators.

Figure 4:
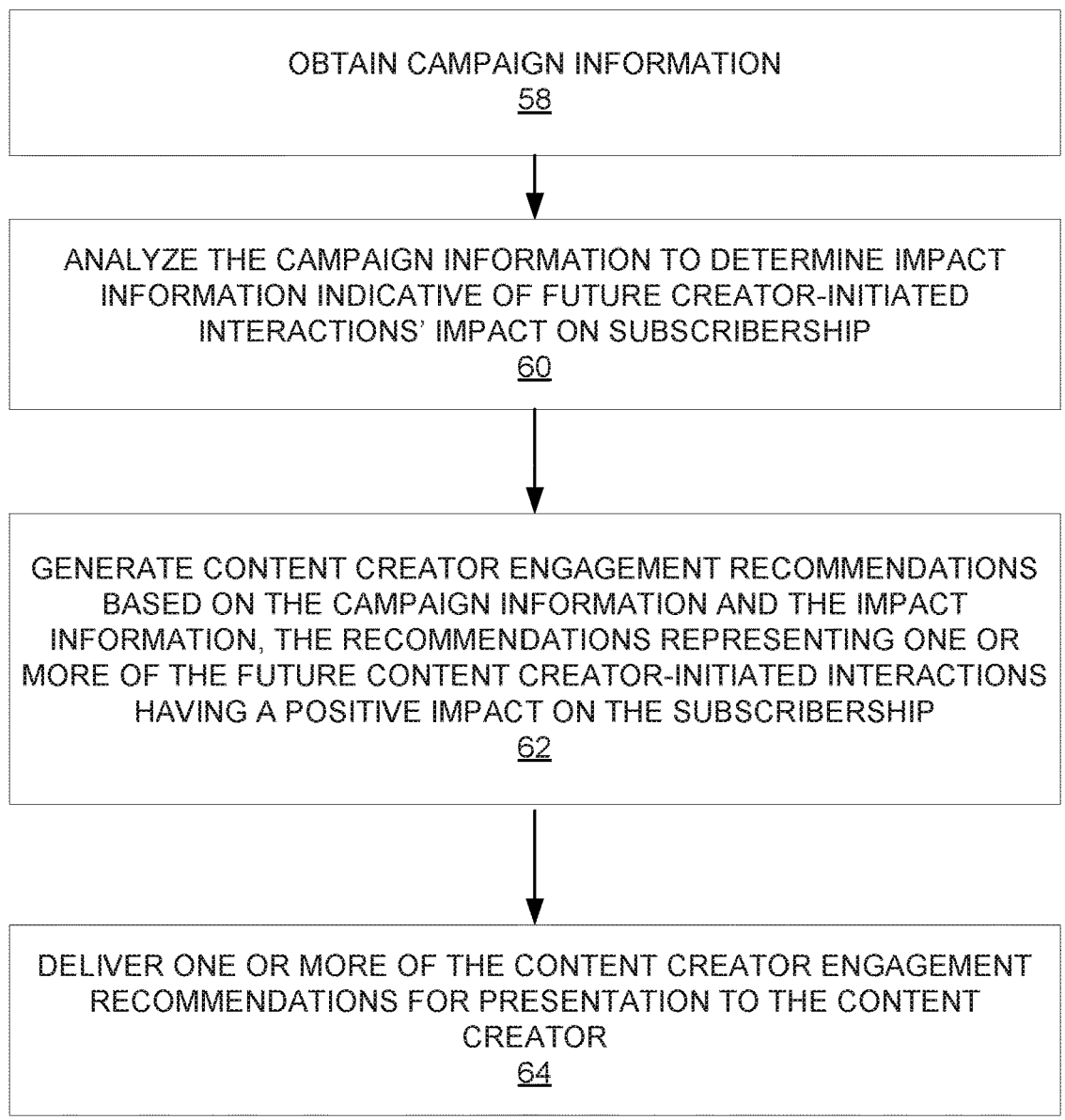
FIG. 4 is an example flow diagram illustrating example processes that may be performed for providing engagement recommendations.

FIG. 4 is a flow chart illustrating an example method 56 comprising certain operations that may be performed for generating and delivering engagement recommendations. Method 56 may include obtaining campaign information at operation 58. Campaign information may include any of the aforementioned information characterizing creation and/or subscribership associated with one or more content creators and/or subscribers. At operation 60, the campaign information may be analyzed to determine impact information indicative of future creator-initiated interactions' impact on subscribership. Determining impact information, as previously discussed, may involve determining impact, impact factors, and triggers associated with content creator and/or subscriber engagement information. Based on the impact information, a system of rules or a behavior model may be developed and applied (or known models and/or statistical evidence) to current engagement scenarios and/or subscribership conditions. At operation 62, content creator engagement recommendations based on the campaign information and the impact information may be generated. The content creator engagement recommendations may represent one or more of the future content creator-initiated interactions having positive impact on subscribership.

As alluded to above, some content creators may wish to specify their preferred support mechanisms. In some cases, content creators may wish to receive support in the form of revenue generated through subscribership. In some cases, content creators may wish to receive support through the assistance of non-subscribers. For example, content creators may seek support from non-subscribers that may sell promotional merchandise, sell or distribute tickets to musical performances by the content creators, etc. In some cases, content creators may wish to receive support through revenue generated by non-subscription related activities such as revenue received through sales of the aforementioned tickets, promotional merchandise, etc. It should be noted that these examples are not limiting, and that the disclosure contemplates a variety of different mechanisms that can be used to support content creation.

As alluded to above, content creators may wish to specify preferences regarding revenue performance, e.g., a desired minimum amount of revenue generated through subscribership, more subscribers subscribing at lower subscription levels versus less subscribers subscribing at higher subscription levels, etc. Such preferences may be characterized as a content creator's "indicia of success," i.e., how the content creator prioritizes his/her subscription-based membership campaign. In cases where the content creator wishes to receive non-subscription support, content creators may specify indicia of success regarding such non-subscription support. For example, a performance content creator interested in gaining prominence may consider the distribution of tickets to an upcoming performance (regardless of whether or not revenue is generated from the ticket distribution) to be indicative of a successful campaign.

Referring back to FIG. 3, performance and impact engine 20a may obtain campaign information that can include creation information and/or subscribership information and correlate that campaign information with a content creator's specified indicia of success. Using one or more of the same or similar analyses described previously, performance and impact engine 20a may determine what actions a content creator may take or engage in to maximize support for the creation of content. For example, testing may be performed with respect to other content creator's subscription-based and/or non-subscription-based support performance to determine what actions may maximize support for content creation. For example, content creator 12 may specify that one indicia of success involves the sale of a certain amount of promotional merchandise. Performance and impact engine 20a may compare promotional merchandise being sold by two other content creators that create the same type of content as content creator 12 to determine whether the type, manner of selling, and/or pricing of the first content creator's promotional merchandise results in better revenue generation than that of a second content creator's promotional merchandise. Based on this testing, performance and impact engine 20a may generate support-maximizing recommendations that can be used by, e.g., content creator 12, to maximize support for his/her campaign, such as information identifying the promotional merchandise resulting in better revenue-generation.

For example, performance and impact engine 20a may obtain campaign information regarding two or more content creators. Based on how similar the campaign information is between the two or more content creators, e.g., content type, number of subscribers, current subscription-generated revenue, etc., performance and impact engine 20a may generate a support-maximizing recommendation for both content creators that they collaborate in creating future content.

Figure 5:
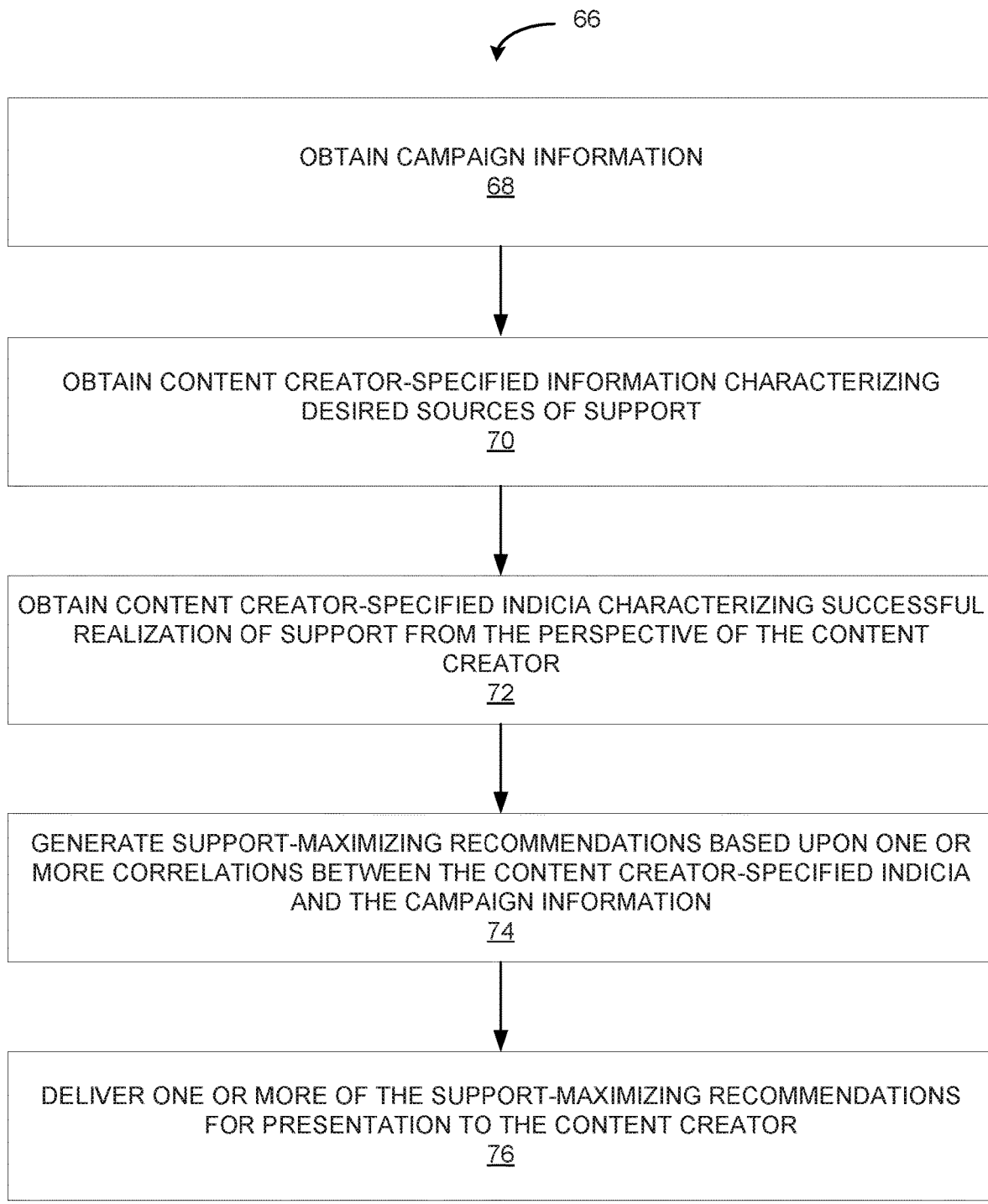
FIG. 5 is an example flow diagram illustrating example processes that may be performed for providing engagement recommendations based at least in part, on revenue generating preferences specified by a content creator.

FIG. 5 is a flow chart illustrating an example method 66 comprising certain operations that may be performed for generating and delivering engagement recommendations. At operation 68, campaign information may be obtained. As previously discussed, performance and impact engine 20a (FIG. 3) may obtain campaign information relevant to one or more content creators and/or subscribers. At operation 70, content creator-specified information characterizing desired sources of support may be obtained. For example, content creator 12 (FIG. 1) may input his/her desired sources of support via subscription component 18. This may include subscribership-generated revenue supporting creation of the recurring content and/or one or more support activities supporting creation of the recurring content, such as non-subscriber support in the form of selling merchandise, among other support mechanisms. At operation 72, content creator-specified indicia characterizing successful realization of support from the content creator's perspective may be obtained. For example, content creator 12 may specify, again via subscription component 18, how he/she may define how successful support may be realized, e.g., ticket distribution, a certain amount of revenue generation, etc. At operation 74, support-maximizing recommendations based upon one or more correlations between the content creator-specified indicia and the campaign information may be generated. At operation 76, one or more of the support-maximizing recommendations may be delivered for presentation to the content creator.

FIG. 6 illustrates an example user interface 78. User interface 78 may be presented to one or more content creators, e.g., content creator 12, that have a creator account on subscription platform 16. User interface 78 may be implemented as part of a webpage "dashboard" and/or separate application accessible by content creator 12. In the context of this disclosure, a dashboard can refer to a collation of information about one or more content creators.

User interface 78 may present options content creator 12 may select to view one or more aspects of content creator 12's subscription-based business via a performance statistics reporting menu 80. For example, user interface 78 may present an option to view content creator 12's earnings over some period time, subscribership statistics over some period of time, etc. User interface 78 may present information regarding content creator 12's subscriber-based business, e.g., earnings, subscribership, etc. in a graphical format such as a chart 82. User interface 78 may present information in other formats or combinations of formats as well, such as in the form of a text report. This information may obtained by performance and impact engine 20a and forwarded to reporting engine 20b for presentation.

As previously discussed, content creator 12 may input one or more preferences regarding revenue generation, non-subscription support, etc. Such preferences may be input via a preferences interface 84 associated with subscription levels, correlated preferential access information, preferred sources of support, specified indicia of success, etc. For example, as illustrated in FIG. 6, options regarding subscription levels, correlated preferential access information, preferred sources of support, specified indicia of success, etc. may be presented to content creator 12. Content creator 12 may interact with preferences interface 84 via drop-down menus (or some other mechanism(s)) to view, enter, and/or select options regarding the above-noted preferences. For example, content creator 12 may select a desired subscriber level, a preferential access activity, and create a correlation between the two, while entering support sources and success indicia specific to his/her campaign. Content creator 12 may enter such preferences upon creation of a creator account with subscription platform 16 and/or anytime during content creator's campaign.

As previously discussed with respect to FIG. 3, reporting engine 20b may output engagement recommendations and/or support recommendations generated by performance and impact engine 20a. One or more of these generated recommendations may be presented to content creator 12 via recommendation drop-down menus 86 and 88. Content creator may choose to implement an engagement or support recommendation and upon completion, may indicate he/she has completed the engagement.

Instead of presenting engagement and/or support recommendations via user interface 78, reporting engine 20b may send notifications or reminders to content creator 12 in real-time or near real-time. For example, when performance and impact engine 20a determines the existence of one or more triggers, performance and impact engine 20a may instruct reporting engine 20b to email and/or send a pop-up window notification to content creator 12's personal webpage instance presenting one or more recommendations.

Support recommendations generated by performance and impact engine 20a may be used to generate and/or re-organize content creator 12's webpage. Subscription platform 16 may include a webpage builder or layout generator configured to generate machine-readable instructions or code, e.g., HTML code, based upon input parameters reflecting support recommendations generated by performance and impact engine 20a and/or reported by reporting engine 20b. For example, a subscription recommendation may involve selling T-shirts as promotional merchandise. Content creator 12's webpage may be updated to present an option for subscribers to buy promotional T-shirts as a way to support content creator 12. For example, content creator 12, in specifying preferred support sources may rank his/her preferred support sources in terms of importance to his/his subscriber-based membership campaign. For example, performance engine 20a may consider content creator 12's specified indicia of success. Based upon such rankings and/or indicia of success, input parameters may be created for the webpage builder or layout generator of subscription platform 16 to use in generating and/or re-organizing aspects and elements of content creator 12's webpage.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to generate and deliver recommendations, the system comprising:
one or more physical processors configured by machine-readable instructions to:
monitor a server managing online content created by a content creator, wherein consumers access the online content through consumer computing platforms accessing the server over a network, the consumers including subscribers to the content creator, the content creator being associated with information characterizing one or both of the content creator or the online content created by the content creator;
analyze the information based on results of one or more interactions between the content creator and one or more of the subscribers to determine how a future interaction will impact subscribership of the content creator; and
generate and deliver a recommendation to either perform the future interaction if the future interaction is determined to have a positive impact on the subscribership, or to avoid the future interaction if the future interaction is determined to have a negative impact on the subscribership, the recommendation being delivered over the network to a computing platform of the content creator to cause the computing platform to present the recommendation within a pop-up window notification on a webpage associated with the content creator.

2. The system of claim 1, wherein the information further characterizes the subscribership of the content creator, the information characterizing the subscribership of the content creator including revenue-related performance of the subscribership.

3. The system of claim 1, wherein the information further characterizes the subscribership of the content creator, the information characterizing the subscribership of the content creator including one or more of a new subscription creation rate, a subscriber retention rate, or a subscriber churn rate.

4. The system of claim 1, wherein the one or more physical processors are further configured by the machine-readable instructions to determine a first impact of instances of subscriber-initiated interaction on the subscribership, and a second impact of instances of content creator-initiated interaction on the subscribership.

5. The system of claim 4, wherein the instances of the subscriber-initiated interaction and/or the second impact of the content creator-initiated interaction are historical instances.

6. The system of claim 5, wherein the historical instances are further representative of the subscriber-initiated interaction between subscribers of a second content creator and the second content creator and/or the content creator-initiated interaction between the second content creator and the subscribers of the second content creator.

7. The system of claim 4, wherein the one or more physical processors are further configured by the machine-readable instructions to determine one or more factors present in the instances of the content creator-initiated interaction contributing to the second impact.

8. The system of claim 7, wherein at least one of the one or more factors comprises timing information.

9. The system of claim 7, wherein the one or more physical processors are further configured by the machine-readable instructions to identify one or more aspects of the instances of the content creator-initiated interaction as one or more triggers for triggering performance of the future interaction.

10. The system of claim 9, wherein the one or more physical processors are further configured by the machine-readable instructions to codify the second impact, the one or more factors, and the one more triggers into one or more rules upon which the recommendation is based.

11. A system configured to generate recommendations, the system comprising:
one or more physical processors configured by machine-readable instructions to:
monitor a server managing online content created by a content creator, wherein consumers access the online content through consumer computing platforms accessing the server over a network, the consumers including subscribers to the content creator, the content creator being associated with campaign information characterizing one or both of the content creator or the online content created by the content creator; and
generate and deliver a recommendation that enhances the content creator's ability to create the online content, the recommendation being generated based upon one or more correlations between indicia characterizing successful realization of support from a perspective of the content creator and the campaign information, the recommendation being delivered over the network to a computing platform of the content creator to cause the computing platform to present the recommendation within a pop-up window notification on a webpage associated with the content creator.

12. The system of claim 11, wherein the one or more physical processors are further configured by the machine-readable instructions to generate webpage layout instructions for organizing webpage elements representing one or more aspects of the webpage presenting the online content.

13. The system of claim 11, wherein the one or more physical processors are further configured by the machine-readable instructions to transmit notifications suggesting that the content creator engage in one or more future interactions determined to result in the successful realization of support.

14. The system of claim 13, wherein the one or more physical processors are configured by the machine-readable instructions to transmit the notifications at times determined to be likely to result in the successful realization of support.

15. The system of claim 11, wherein the content creator is further associated with non-subscribership support activities.

16. The system of claim 11, wherein the one or more physical processors are further configured by the machine-readable instructions to analyze the campaign information associated with one or more other content creators related to the content creator.

17. A method to generate recommendations, the method comprising:
monitoring a server managing online content created by a content creator, wherein consumers access the online content through consumer computing platforms accessing the server over a network, the consumers including subscribers to the content creator, the content creator being associated with information characterizing one or both of the content creator or the online content created by the content creator;

analyzing the information based on results of one or more interactions between the content creator and one or more of the subscribers to determine how a future interaction will impact subscribership of the content creator; and generating and delivering a recommendation to either perform the future interaction if the future interaction is determined to have a positive impact on the subscribership, or to avoid the future interaction if the future interaction is determined to have a negative impact on the subscribership, the recommendation being delivered over the network to a computing platform of the content creator to cause the computing platform to present the recommendation within a pop-up window notification on a webpage associated with the content creator.

18. The method of claim 17, further comprising determining the impact by:

determining first impact of instances of subscriber-initiated interaction on the subscribership and/or second impact of instances of content creator-initiated interaction on the subscribership; and determining one or more factors present in the instances of the content creator-initiated interaction contributing to the second impact.

19. The method of claim 18, further comprising:

identifying one or more aspects of the instances of the content creator-initiated interaction as one or more triggers for triggering performance or avoidance of one or more other future interactions; and codifying the second impact, the one or more factors, and the one more triggers into one or more rules upon which the recommendation is based.

20. The method of claim 19, wherein at least one of the one or more factors comprises timing information.

* * * * *